United States Patent
Chen et al.

(10) Patent No.: US 9,603,141 B2
(45) Date of Patent: Mar. 21, 2017

(54) PHYSICAL DOWNLINK CONTROL CHANNEL AND PHYSICAL HYBRID AUTOMATIC REPEAT REQUEST INDICATOR CHANNEL ENHANCEMENTS

(71) Applicant: TEXAS INSTRUMENTS INCORPORATED, Dallas, TX (US)

(72) Inventors: Runhua Chen, Plano, TX (US); Eko N. Onggosanusi, Allen, TX (US); Vikram Chandrasekhar, Dallas, TX (US); Anthony Edet Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/679,913

(22) Filed: Apr. 6, 2015

(65) Prior Publication Data

US 2015/0215916 A1 Jul. 30, 2015

Related U.S. Application Data

(63) Continuation of application No. 13/458,410, filed on Apr. 27, 2012, now Pat. No. 9,001,756.

(60) Provisional application No. 61/479,655, filed on Apr. 27, 2011, provisional application No. 61/481,840, filed on May 3, 2011, provisional application No. 61/483,848, filed on May 9, 2011, provisional application No. 61/525,315, filed on Aug. 19, 2011, provisional application No. 61/542,962, filed on Oct. 4, 2011, provisional application No. 61/558,196, filed on Nov. 10, 2011.

(51) Int. Cl.
*H04W 4/00* (2009.01)
*H04W 72/04* (2009.01)
*H04J 11/00* (2006.01)
*H04L 5/00* (2006.01)

(52) U.S. Cl.
CPC ....... *H04W 72/042* (2013.01); *H04J 11/0033* (2013.01); *H04L 5/0023* (2013.01); *H04L 5/0053* (2013.01)

(58) Field of Classification Search
CPC .................................................. H04W 72/042
USPC ....................................................... 370/329
See application file for complete search history.

(56) References Cited

U.S. PATENT DOCUMENTS

2010/0296389 A1* 11/2010 Khandekar ........... H04L 5/0007
370/216
2011/0038310 A1* 2/2011 Chmiel ................ H04J 11/0069
370/328

(Continued)

*Primary Examiner* — Wei Zhao
(74) *Attorney, Agent, or Firm* — Ronald O. Neerings; Charles A. Brill; Frank D. Cimino

(57) ABSTRACT

A wireless transmission system included at least one user equipment and a base station. The base station is operable to form a downlink control information block, modulate the downlink control information, precode the modulated downlink control information, and transmit the precoded, modulated downlink control information on at least one demodulation reference signal antenna port to the at least one user equipment. The precoded, modulated downlink control information is mapped to a set of N1 physical resource block pairs in a subframe from an orthogonal frequency division multiplexing symbol T1 to and orthogonal frequency division multiplexing symbol T2.

11 Claims, 7 Drawing Sheets

(56) References Cited

U.S. PATENT DOCUMENTS

2011/0235599 A1* 9/2011 Nam .................... H04L 1/0027
                                                      370/329
2011/0243066 A1   10/2011 Nayeb Nazar et al.
2012/0250523 A1   10/2012 Miki

* cited by examiner

PHYSICAL DOWNLINK CONTROL CHANNEL AND PHYSICAL HYBRID AUTOMATIC REPEAT REQUEST INDICATOR CHANNEL ENHANCEMENTS

CLAIM OF PRIORITY

This application is a continuation of prior application Ser. No. 13/458,410, filed Apr. 27, 2012, now U.S. Pat. No. 9,001,756, which claims priority under 35 U.S.C. 119(e)(1) to U.S. Provisional Application No. 61/479,655 filed Apr. 27, 2011, U.S. Provisional Application No. 61/481,840 filed May 2, 2011, U.S. Provisional Application No. 61/483,848 filed May 9, 2011, U.S. Provisional Application No. 61/525,315 filed Aug. 19, 2011, U.S. Provisional Application No. 61/542,962 filed Oct. 4, 2011 and U.S. Provisional Application No. 61/558,196 filed Nov. 10, 2011.

TECHNICAL FIELD OF THE INVENTION

The technical field of this invention is wireless communication such as wireless telephony.

BACKGROUND OF THE INVENTION

The 3rd Generation Partnership Project Evolved Universal Terrestrial Radio Access (E-UTRA) Long Term Evolution (LTE) Rel. 8 to 10 control signals include Physical Control Format Indicator CHannel (PCFICH), Physical Hybrid ARQ Indicator CHannel (PHICH) and Physical Downlink Control CHannel (PDCCH).

Legacy PDCCH in LTE Rel. 8 to 10 is designed with Cell specific Reference Symbols (CRS) based transmission. A PDCCH is scrambled with the Cell Radio Network Temporary Identifier (C-RNTI) of the user being scheduled and precoded with 1/2/4 transmit diversity, cross-interleaved with other PDCCHs and then transmitted in the entire system bandwidth in the control region of a subframe. The control region contains the first N Orthogonal Frequency Division Multiplexing (OFDM) symbols in the first slot of a subframe. The value of N is N=1, 2, 3 or 4 in case of 1.4 MHz bandwidth and is signalled in the PCFICH. Through CRS-based transmit diversity and cross-interleaving within the system bandwidth, Rel. 10 PDCCH exploits spatial and frequency diversity to maximize the robustness of the control signal and ensures its reliable reception and coverage in a cell. A PDCCH may carry a DL grant or an UL grant.

LTE Rel. 10 introduces a new PDCCH transmission scheme for macro-relay backhaul link called R-PDCCH. R-PDCCH inherits all the Downlink Control Information (DCI) formats of legacy LTE system including DCI 1, 1A, 1B, 1C, 2, 2A, 2B, 2C and 4 but relies on Demodulation Reference Signal (DMRS) based transmission instead of CRS based transmit diversity. Thus for each relay node, a semi-statically configured downlink resource is reserved for the eNB-to-RN link by higher-layer. This resource is used for R-PDCCH and R-PDSCH transmission. In the frequency domain the reserved resource features a set of $N_{R\text{-}PDCCH}$ resource blocks. In the time domain the transmission resource features a group of OFDM symbols in the respective first slot and second slot. The first slot is used for DL grant transmission. The second slot is used for UL grant transmission. The reserved resources of both the first and second slots can be also used for R-PDSCH in the eNB-to-RN backhaul link, provided that they are not occupied by R-PDCCH.

When a relay is configured with R-PDCCH with cross-interleaving: R-PDCCH is transmitted with CRS-based transmit diversity according to the same procedure as in legacy LTE system, except that interleaving is done in the virtual system bandwidth of $N_{R\text{-}PDCCH}$ Resource Blocks (RBs).

When a relay is configured with R-PDCCH without cross-interleaving: R-PDCCH can be transmitted with CRS-based transmit diversity in the $N_{R\text{-}PDCCH}$ RBs. Alternatively, R-PDCCH can be transmitted with DMRS-based rank-1 precoding in the $N_{R\text{-}PDCCH}$ RBs, on antenna port 7 with a scrambling sequence ID (SCID) of 0. The actual number of Physical Resource Blocks (PRBs) used for R-PDCCH depends on the R-PDCCH aggregation level and candidate index.

SUMMARY OF THE INVENTION

A wireless transmission system included at least one user equipment and a base station. The base station is operable to form a downlink control information block, modulate the downlink control information, precode the modulated downlink control information, and transmit the precoded, modulated downlink control information on at least one demodulation reference signal antenna port to the at least one user equipment. The precoded, modulated downlink control information is mapped to a set of N1 physical resource block pairs in a subframe from an orthogonal frequency division multiplexing symbol T1 to and orthogonal frequency division multiplexing symbol T2.

The downlink control information is a downlink assignment or an uplink grant. The base station transmits the precoded, modulated downlink control information on one demodulation reference signal antenna port. The base station transmits the precoded, modulated downlink control information on more than one demodulation reference signal antenna ports. The base station configures the at least one demodulation reference signal antenna port by higher-layer signaling. The base station scrambles the at least one demodulation reference signal antenna port by a scrambling sequence configured by higher-layer signaling. The base station dynamically signals the at least one demodulation reference signal antenna port and the corresponding scrambling sequence by a D-PDCCH-config grant, which is modulated and transmitted from the said base station based on cell specific reference signal.

The base station fixed or semi-statically configures the orthogonal frequency division multiplexing symbol T1 by higher-layer signaling. The orthogonal frequency division multiplexing symbol T1 is a first orthogonal frequency division multiplexing symbol outside a legacy control region. The base station fixed or semi-statically configures the orthogonal frequency division multiplexing symbol T2 by higher-layer signaling. The orthogonal frequency division multiplexing symbol T2 is dependent on a category of a corresponding user equipment. The base station is further operable to determine the orthogonal frequency division multiplexing symbol T2 by the user equipment and transmits to the base station in the uplink.

The base station configures the set of N1 physical resource block pairs by higher-layer signaling. The base station transmits at least one layer of data stream from the base station to the at least one user equipment in the subframe. The scheduling information of the at least one layer of data stream is included in the downlink control information.

In the wireless transmission system the base station forms a downlink control information block including unmodulated information bits and a downlink acknowledge/not acknowledge bit.

BRIEF DESCRIPTION OF THE DRAWINGS

These and other aspects of this invention are illustrated in the drawings, in which:

FIG. 8A illustrates a case where grants do not cross from slot 0 to slot 1 and FIG. 8B illustrates a case where grants cross from slot 0 to slot 1;

DETAILED DESCRIPTION OF PREFERRED EMBODIMENTS

Figure 1:
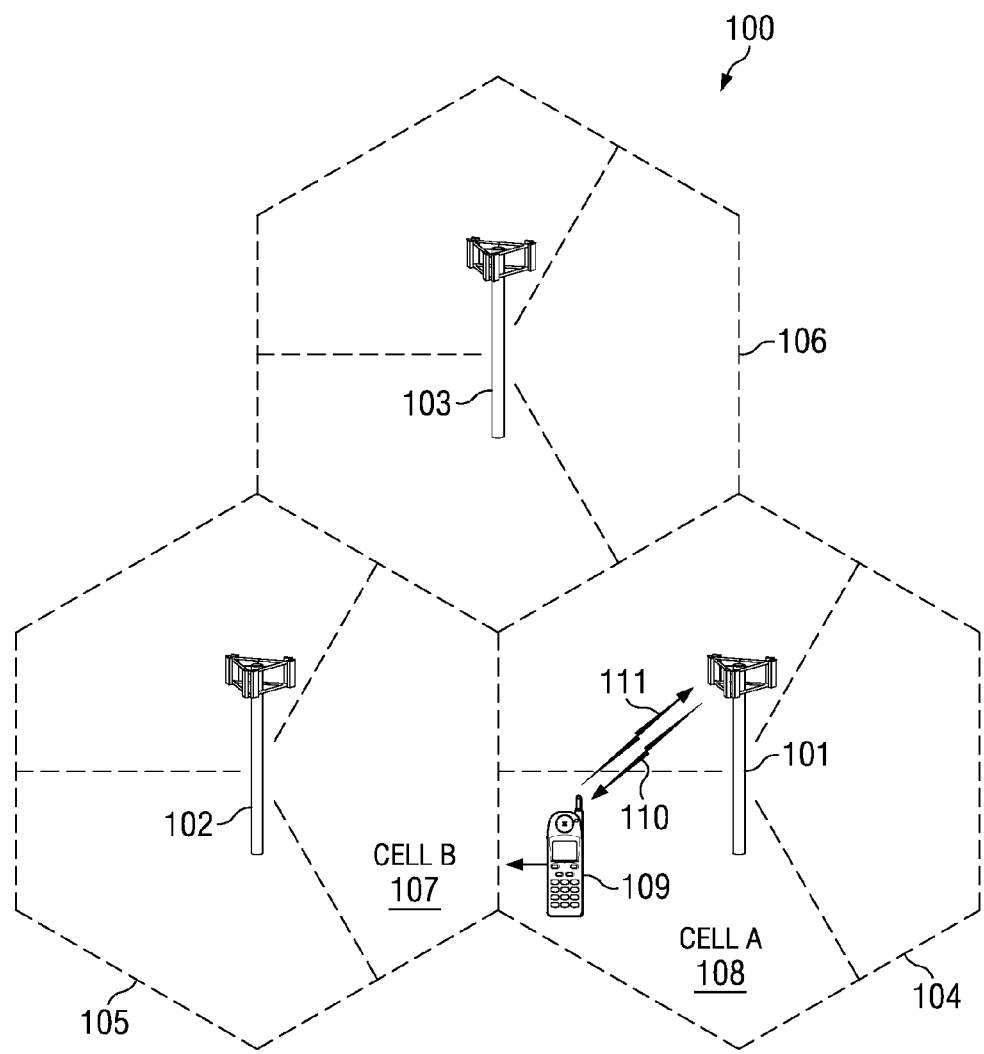
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
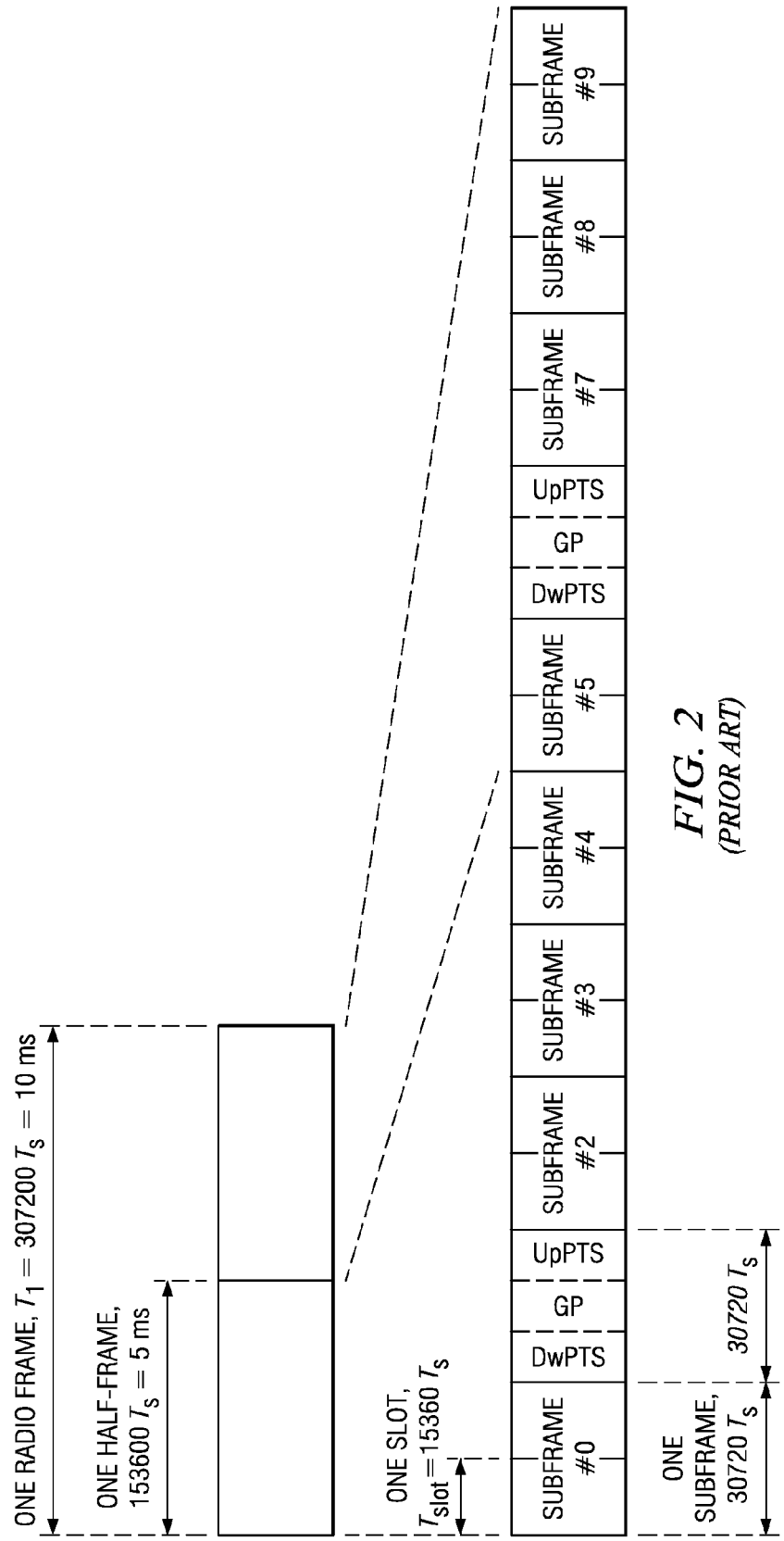
FIG. 2 shows the Evolved Universal Terrestrial Radio Access (E-UTRA) Time Division Duplex (TDD) frame structure of the prior art.
Figure 3:
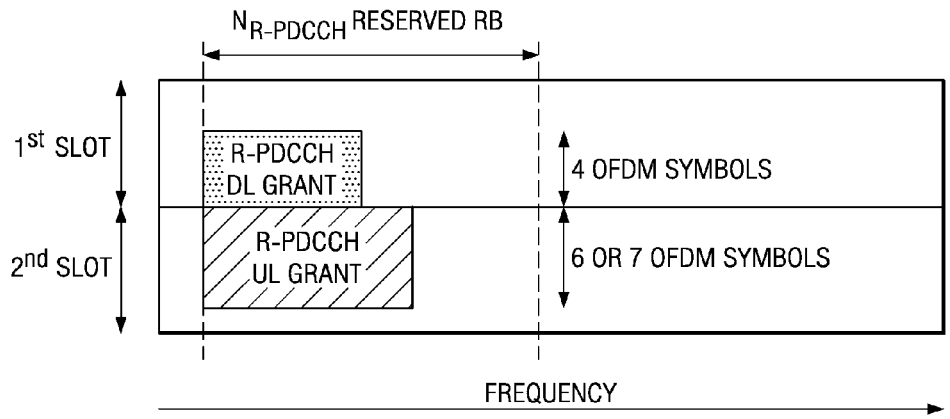
FIG. 3 illustrates a comparison of a R-PDCCH downlink grant and a R-PDCCH uplink grant.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Con-figuration | Switch-point periodicity | Sub-frame number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In this invention the R-PDCCH format of relay backhaul link in Rel. 10 is extended to regular eNB-to-UE PDCCH transmission in Rel. 11. This allows DMRS-based PDCCH transmission in Rel. 11 in addition to CRS-based PDCCH transmission. This is called D-PDCCH (DMRS-PDCCH). The D-PDCCH inherits all the characteristics of the R-PDCCH except for the new proposals outlined below. The current R-PDCCH design only supports rank-1 transmission of R-PDCCH and is confined to antenna port 7 with a SCID of 0. Thus the prior art downlink (DL) RB can be only used to send a single R-PDCCH to schedule 1 user.

It is possible to allow Multiuser, Multiple Input, Multiple Output (MU-MIMO) transmission of PDCCH in the Rel. 11 time frame so that PDCCHs of two or more users can be transmitted in the same frequency. Such user multiplexing in the control region is an effective means to increase the control channel capacity for Rel. 11. The control capacity can be a serious problem in a Coordinated Multi-point (CoMP) scenario where the low-power remote radio heads (RRHs) do not have their own cell ID and therefore do not create additional control channels. This is in contrast to a scenario where all RRHs are stand-alone cells and have their own control resources. Thus increasing the control capacity through MU-MIMO spatial multiplexing can be very helpful in the common cell-ID RRH scenario.

This invention includes following design options for DMRS-based PDCCH enhancements. In a first embodiment a UE configured to receive its PDCCH with DMRS-based precoding (D-PDCCH), the D-PDCCH is transmitted on antenna port 7 or 8. The D-PDCCH is scrambled with a SCID of 0 or 1. The UE-specific antenna port (7 or 8) and SCID (0 or 1) of a D-PDCCH is semi-statically configured by higher-layer Radio Resource Control (RRC) signaling. Thus a UE can be configured to decode its D-PDCCH on antenna port 8 with a SCID of 0. The DL grant and UL grant can be semi-statically configured with the same/different antenna ports and/or SCID. Thus a UE may be configured to decode DL grant in D-PDCCH on antenna port 7, and decode UL grant on antenna port 8.

In an alternative embodiment the UE-specific antenna port and SCID for D-PDCCH are dynamically signaled by a D-PDCCH-config-grant. The D-PDCCH-config-grant dynamically signals the antenna port and SCID of the corresponding D-PDCCH. The UE first decodes the D-PDCCH-config-grant to obtain the antenna Port (AP) and SCID information, then proceeds to blind decoding of D-PDCCH. The D-PDCCH-config-grant is transmitted with legacy PDCCH format such as DCI 1C with CRS based transmission. The D-PDCCH-configuration grant is transmitted L subframes prior to the corresponding D-PDCCH. If L is 0, then D-PDCCH-configuration-grant and the corresponding D-PDCCH are transmitted in the same subframe. This can be quite challenging to the UE because the number of blind decodings will significantly increase, while the memory requirement for control decoding will be more stringent. On the other hand L greater than 0 appears desirable from the UE blind decoding and memory perspective, but the scheduling latency will be increased compared to legacy PDCCH.

It is possible to support rank greater than 1 transmission of D-PDCCH to increase control channel capacity. This comes at the risk of reduced D-PDCCH coverage. In one embodiment, the transmission rank, set of DMRS antenna ports and SCID of a D-PDCCH are UE-specific and semi-statically configured by the higher layer. For example a UE can be configured to receive D-PDCCH with rank 1 transmission on a single antenna port 7 or 8, scrambled by a pre-defined SCID of 0 or 1 and all configured by higher-layer. In a second example, a UE can be configured by higher layer to receive D-PDCCH with rank greater than 1, using spatial multiplexing on antenna ports (7, . . . , 7+R−1) with a SCID of 0. In another embodiment, the transmission rank, antenna ports and SCID are dynamically configured with the D-PDCCH-config-grant as described above.

In Rel. 10 R-PDCCH spatial multiplexing of the R-PDSCH and R-PDCCH carrying a DL grant for the same relay is not supported. Thus if the RN receives a resource allocation for R-PDSCH that overlaps a PRB pair in which a DL grant R-PDCCH is detected in the first slot, the RN node shall assume that there is no R-PDSCH transmission for it in the first slot of that PRB pair. Thus the R-PDCCH carrying a DL grant and R-PDSCH can not overlap in the frequency domain in the first slot, even if their antenna ports are orthogonal such as R-PDCCH transmitted on AP 7 and R-PDSCH transmitted on AP 8.

To the contrary spatial multiplexing of R-PDSCH and R-PDCCH carrying UL grant for the same relay is not precluded in Rel. 10. An R-PDCCH carrying UL grant can be transmitted on AP7 in the second slot, while R-PDSCH can be transmitted on the same PRB in the second slot. In this case R-PDSCH can be scheduled on a different antenna port than the R-PDSCH carrying UL grant such as AP 8. Spatial multiplexing of R-PDSCH for a relay via AP 8 and R-PDCCH carrying DL grant for a different relay via AP 7 is not precluded in Rel. 10 backhaul link.

If spatial multiplexing of PDSCH data and D-PDCCH carrying DL grant for the same UE is desirable in Rel. 11, then the following multiplexing solutions are possible.

The PDSCH of a UE overlaps in one or more PRB in which a DL grant (D-PDCCH) is detected for this UE. If the D-PDCCH and the corresponding PDSCH are assigned to different antenna port and/or SCID, the UE may assume that PDSCH is transmitted in the PRB in which the D-PDCCH is detected. For example if D-PDCCH is transmitted on AP 7 with a SCID of 0 and the UE receives a DL resource allocation for 1-layer beamforming on AP 8 and a SCID of 0, then UE may assume that PDSCH can be transmitted in a PRB overlapping with the D-PDCCH.

In another embodiment, if multiple antenna ports are assigned for PDSCH transmission, the UE may assume that the PDSCH is transmitted in a PRB overlapping with D-PDCCH, if the antenna port and/or SCID are different for the PDSCH and D-PDCCH. For example if D-PDCCH is transmitted on AP 7 with a SCID of 0 and the UE receives a DL grant indicating rank-2 transmission on AP 7 and AP 8 with a SCID of 0, then in a PRB overlapping with D-PDCCH, UE may assume that the layer on antenna port AP 7 is not transmitted while the layer on antenna port AP 8 is transmitted.

For Rel. 10 R-PDCCH the control region size in the time domain of the starting/ending OFDM symbols is semi-statically configured by higher layer RRC signaling. A DL grant R-PDCCH is transmitted in the first slot. A fixed control region size is used where the starting OFDM symbol in the first slot is fixed to be OFDM symbol 3. The unused OFDM symbols are intended for the DL control transmission via Multimedia Broadcast multicast service Single Frequency Network (MBSFN) subframes from the RN to UE. These also serve as a tool for interference management of the control signaling when cross-carrier scheduling is used.

TABLE 2

| Configuration | DL-StartSymbol | End symbol index |
|---|---|---|
| 0 | 1 | 6 |
| 1 | 2 | 6 |
| 2 | 3 | 6 |

A UL grant R-PDCCH is transmitted in the second slot, always starting from OFDM symbol 0. This allows switching between donor-eNB-to-RN and RN-to-UE transmission.

TABLE 3

| Configuration | Start symbol index | End symbol index |
|---|---|---|
| 0 | 0 | 6 |
| 1 | 0 | 5 |

For D-PDCCH, this invention includes two possible types of embodiment. The first embodiment follows the slot-based splitting for DL and UL grants from R-PDCCH. The second embodiment abolishes this restriction.

Figure 4:
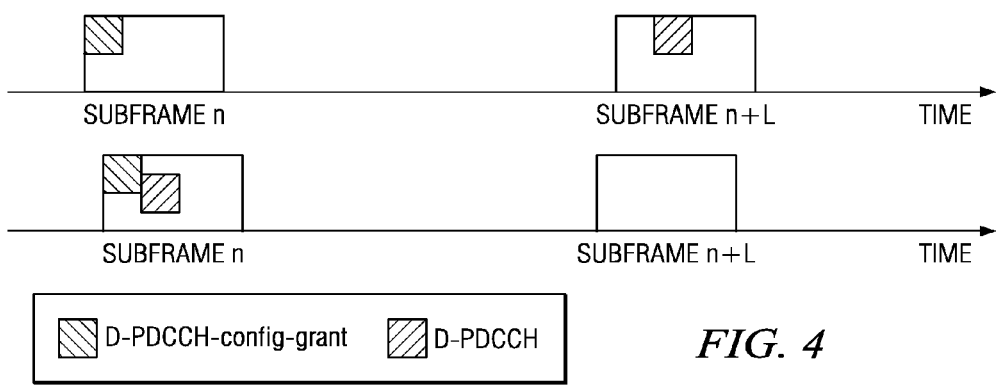
FIG. 4 illustrates the cases of a D-PDCCH-config-grant in a differing subframe than a D-PDCCH and a D-PDCCH-config-grant in the same subframe as a D-PDCCH.

For this first embodiment with slot-based splitting for DL and UL grants based on R-DPCCH, this is DL grant which occupies the first slot of a subframe. For Rel. 11 D-PDCCH, the control region size in the time domain, also known as the starting OFDM symbol of a D-PDCCH, can be determined as shown in FIG. 4. In a first alternative the starting OFDM symbol of D-PDCCH for a DL grant is fixed such as OFDM symbol 3 in the first slot which is the same as R-PDCCH in Rel. 10. In a second alternative the starting OFDM symbol of D-PDCCH for a DL grant is fixed for a given configuration. Thus the starting OFDM symbol of D-PDCCH (OFDM symbol 0, 1, 2 or 3) is semi-statically configured. This may simply reuse the set of values in Rel. 10 R-PDCCH. A preferred alternative is to add an additional starting OFDM symbol 0.

In an additional embodiment, if a UE receives a DL assignment on D-PDCCH and if the UE detects via PCFICH on its legacy control region that the number of OFDM symbols is strictly smaller than the starting symbol for D-PDCCH, then the UE shall assume that PDSCH is also present on the OFDM symbols between the last symbol of the legacy PDCCH region and the first symbol of the D-PDCCH. The UE shall also assume that its PDSCH is mapped around the OFDM symbols containing D-PDCCH.

For either the first or second alternative above if a UE receives a DL assignment on D-PDCCH and if the UE detects via PCFICH on its legacy control region that the number of OFDM symbols is strictly smaller than the starting symbol for D-PDCCH, then the UE assumes one of the following two embodiment for determining the resources on which its PDSCH is mapped. If the DL-assignment on D-PDCCH overlaps with the DL assignment for PDSCH, the UE assumes that in the overlapping PRBs, the PDSCH is also present on the OFDM symbols between the last symbol of the legacy PDCCH region and the first symbol of the D-PDCCH. The UE also assumes that within the overlapping PRB assignment, its PDSCH is mapped around the resource elements containing the D-PDCCH. In the second alternative if the DL-assignment on D-PDCCH overlaps with the DL assignment for PDSCH, the UE assumes that its PDSCH is also present on the OFDM symbols between the last symbol of the legacy PDCCH region and the first symbol of the D-PDCCH. The UE also assumes that its PDSCH is mapped around the OFDM symbols containing the D-PDCCH.

Figure 6A:
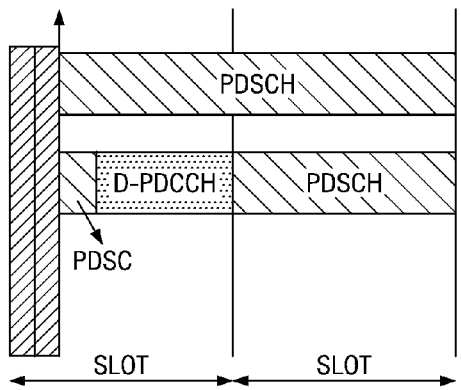
FIG. 6A illustrates rate matching around REs containing D-PDCCH.
Figure 6B:
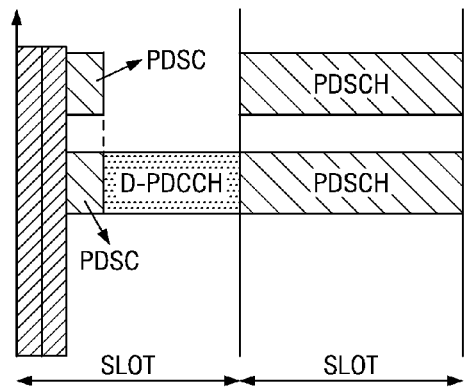
FIG. 6B illustrates rate matching around OFDM symbols.

FIGS. 6A and 6B illustrate two alternative assignments for PDSCH mapping with slot-based splitting of UL and DL grants. FIG. 6A illustrates rate matching around REs containing D-PDCCH. FIG. 6B illustrates rate matching around OFDM symbols.

Table 4 shows the principle behind second alternative described above.

TABLE 4

| Configuration | DL-StartSymbol | End symbol index |
|---|---|---|
| 0 | 0 | 6 |
| 1 | 1 | 6 |
| 2 | 2 | 6 |
| 3 | 3 | 6 |

In a third alternative the starting OFDM symbol of a D-PDCCH for a DL grant is dynamically and implicitly signaled depending on the legacy control region size signaled in PCFICH. First, the UE reads the PCFICH to determine the legacy control region span in the time domain such as including 1, 2 or 3 OFDM symbols. Secondly, the starting OFDM symbol of D-PDCCH is the first OFDM symbol outside of the legacy control region. In an example the legacy control region size of a cell is 2 OFDM symbols with a PCFICH of 2. After the UE reads the PCFICH, it determines that D-PDCCH starts from the third OFDM symbol (OFDM symbol 2). This controls resources for legacy LTE terminals and Rel. 11 terminals can be dynamically adjusted based on the percentage of legacy UEs and Rel. 11 UEs in the deployment. As legacy UE gradually phase out in the network, the network can configure a smaller legacy control region such as a PCFICH of 1) and assign more resources for Rel. 11 D-PDCCH.

In a fourth alternative the D-PDCCH starts from OFDM symbol 0 and may occupy the entire PRB in the first slot. Thus the D-PDCCH is allowed to extend into the legacy control region in the time domain. In this alternative it is possible for a legacy PDCCH and D-PDCCH to collide. The eNB scheduler must ensure that the D-PDCCH and legacy PDCCH (Rel. 8/9/10) do not overlap.

The following describes the configuration for UL grant which takes place in the second slot of a subframe. The relevant component is the ending OFDM symbol. The ending OFDM symbol of a D-PDCCH can be the last OFDM symbol of the first slot. This invention differs from the Rel. 10 R-PDCCH principle because the switching time mentioned above is not needed for D-PDCCH. The start and end symbol index for the second slot are always 0 and 6, respectively.

Figure 7:
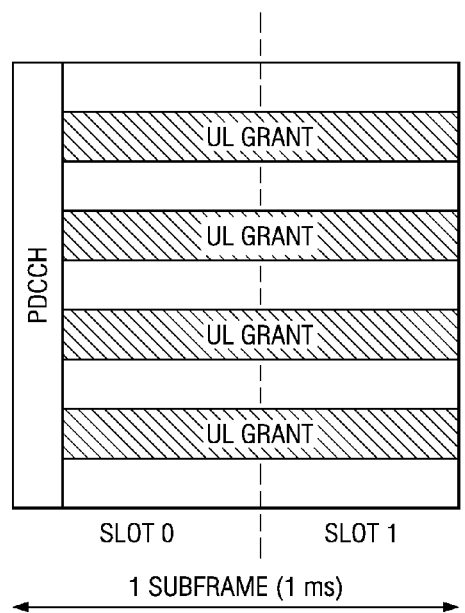
FIG. 7 illustrates a the first scenario illustrated in which DL grants are absent and the user equipment assumes that uplink grants are carried across both slots of the VRB pairs configured for D-PDCCH transmission.
Figure 8A:
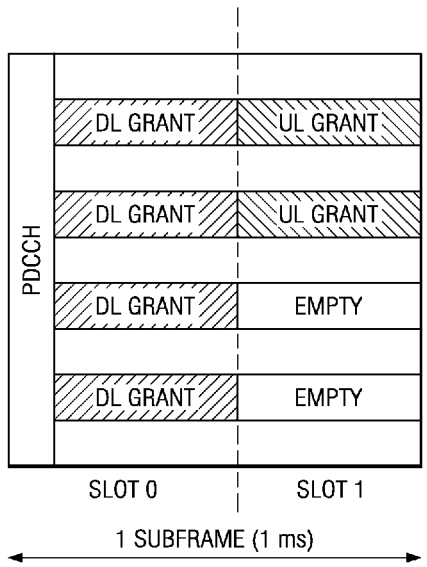
FIGS. 8A and 8B illustrate a second scenario in which downlink grants are present.
Figure 8B:
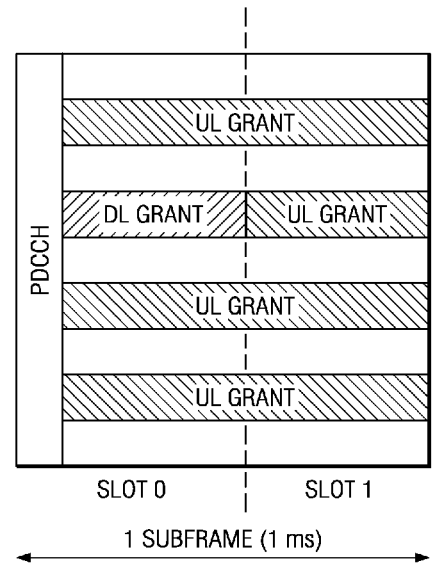

The following describes the conditional assignment of UL grant either in both slots or only in the second slot. A conditional assignment of UL grant is defined based on whether or not DL grants are transmitted in the first slot of same subframe. Assume that DL grants if transmitted are carried in the first slot of Virtual Resource Block (VRB) pairs configured to carry D-PDCCH. There are two scenarios. In the first scenario illustrated in FIG. 7 DL grants are absent and the UE assumes that UL grants, if transmitted on D-PDCCH, are carried across both slots of the VRB pairs configured for D-PDCCH transmission. In the second scenario illustrated in FIGS. 8A and 8B DL grants are present. It is desirable for channel estimation accuracy to preclude the case of PDSCH being transmitted in the same VRB pairs containing D-PDCCH. In this invention the UE shall not expect to receive a DL resource allocation which overlaps VRB pair(s) in a downlink assignment is detected in the first slot. This precludes multiplexing of PDSCH and D-PDCCH containing a downlink assignment in the same VRB pair(s). There are two candidate UE behaviors for determining whether a UL grant is transmitted in the same VRB pair(s) as a DL grant. In the first alternative illustrated in FIG. 8A if both DL grant and UL grants are transmitted for the same UE on the D-PDCCH, the UE assumes that the UL grants can be carried in the second slot of only those VRB pairs in which the first slot carries a DL grant. Thus the aggregation level for UL grant is less than or equal to the aggregation level of the DL grant. This permits the possibility that the aggregation levels for UL grant and DL grants for the same UE are always the same. In the second alternative illustrated in FIG. 8B if both DL grant and UL grants are transmitted for the same UE on the D-PDCCH, the UE assumes that the UL grant is present at least in the second slot of those VRB pairs in which the first slot carries a DL grant. Thus UL grants may be transmitted in one slot and/or two slots depending on whether or not the VRB pairs carrying UL grant carry DL grants.

The second embodiment does not include slot-based splitting for DL and UL grants. While the slot-based splitting for DL and UL grants is possible (above first embodiment), such restriction is unnecessary for D-PDCCH since the DL and UL traffics are asymmetric for typically PDSCH transmission unlike that in the relaying operations. Such a design removes the slot-based splitting for DL and UL grants. Thus DL and UL grants may occupy the same set of OFDM symbols within a subframe. The DL and UL grants can coexist and be searched together within the same set of configured D-PDCCH resources in time and frequency domains such as respective across OFDM symbols and frequency PRBs or PRB pairs. The OFDM symbol for a subframe starts for D-PDCCH. The setup mechanism outlined above can be applied without the restriction of DL-grant-only usage. The starting OFDM symbol for D-PDCCH which can carry DL and/or UL grant(s) can be fixed to a value (symbol 0, 1, 2, or 3), semi-statically configured or dynamically/implicitly signaled.

Figure 5:
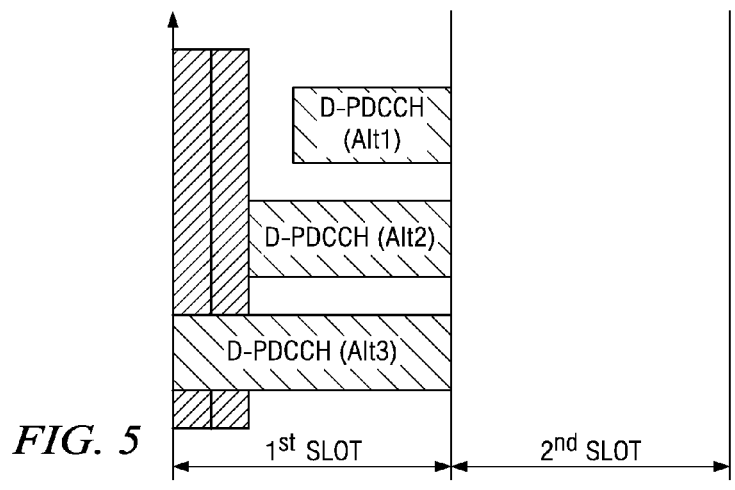
FIG. 5 illustrates the region size in the time domain known as the starting OFDM symbol of a D-PDCCH.

Next the ending OFDM symbol is selected. There are two alternatives. In the first alternative the D-PDCCH ends in a designated OFDM symbol within a subframe. The designated OFDM symbol is not the last OFDM symbol within the subframe. For example it is possible to designate the ending OFDM symbol to be within the first slot for both DL and UL grants like the last OFDM symbol in the first slot illustrated in FIG. 5 for both DL and UL grants. This alternative allows a UE to perform micro-sleep (power saving) when no DL grant is detected. This alternative offers a more relaxed timing budget for the UE because the UE is able to start PDSCH demodulation/decoding earlier. The ending OFDM symbol can either be fixed (not configurable) or semi-statically configured via RRC signaling or SIBx carried via D-BCH. The semi-static configuration requires the UE to decode either a PDSCH transmission or a broadcast paging grant. This can be accomplished using a Rel. 8 mechanism. This may reduce the benefit of introducing a new D-PDCCH. A non-configurable ending OFDM symbol seems to be sufficient considering that the PRB/PRB pair allocation for D-PDCCH can be semi-statically configured.

In the second alternative the D-PDCCH ends in the last OFDM symbol within a subframe. This is a pure Frequency Division Multiplexing (FDM) structure of the control channel. One D-PDCCH either a DL or an UL grant expands across the entire subframe. Thus both PRBs in a PRB pair are used for D-PDCCH transmission. One advantage of this design is a more robust demodulation performance in high-mobility deployment scenario because demodulation of PDCCH can use the DMRS in both slots in a subframe. This is important because the D-PDCCH will be used for regular UE scheduling instead of only for relays.

For either the first or second alternative above if a UE receives a DL assignment on D-PDCCH and if the UE detects via PCFICH on its legacy control region that the number of OFDM symbols is strictly smaller than the starting symbol for D-PDCCH, then the UE assumes one of the following two embodiment for determining the resources on which its PDSCH is mapped. If the DL-assignment on D-PDCCH overlaps with the DL assignment for PDSCH, the UE assumes that in the overlapping PRBs, the PDSCH is also present on the OFDM symbols between the last symbol of the legacy PDCCH region and the first symbol of the D-PDCCH. The UE also assumes that within the overlapping PRB assignment, its PDSCH is mapped around the resource elements containing the D-PDCCH. In the second alternative if the DL-assignment on D-PDCCH overlaps with the DL assignment for PDSCH, the UE assumes that its PDSCH is also present on the OFDM symbols between the last symbol of the legacy PDCCH region and the first symbol of the D-PDCCH. The UE also assumes that its PDSCH is mapped around the OFDM symbols containing D-PDCCH.

Figure 9A:
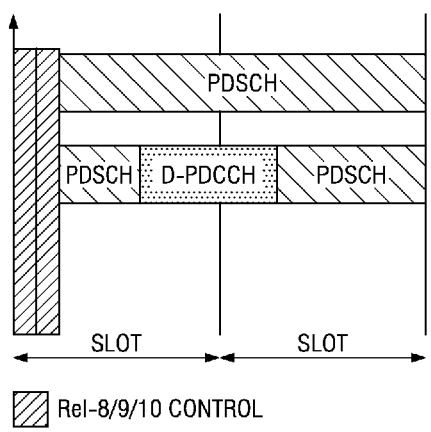
FIG. 9A illustrates rate matching around resource elements containing D-PDCCH for PDSCH mapping with slot-based splitting of UL and DL grants.
Figure 9B:
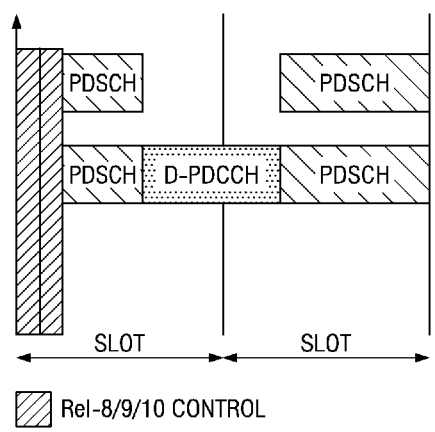
FIG. 9B illustrates rate matching around OFDM symbols for PDSCH mapping with slot-based splitting of uplink and downlink grants.
Figure 10A:
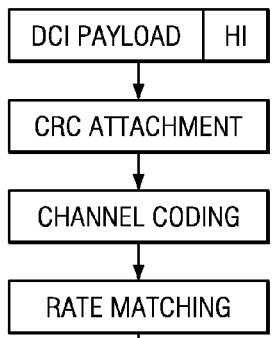
FIG. 10A illustrates joint encoding of downlink DCI and HI.
Figure 10B:
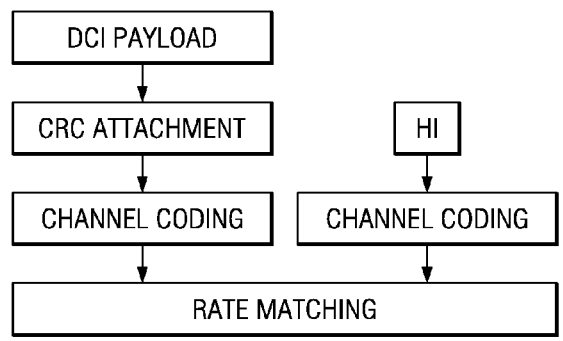
FIG. 10B illustrates separate encoding of downlink DCI and HI.

FIGS. 9A and 9B illustrate two alternative assignments for PDSCH mapping with slot-based splitting of UL and DL grants. FIG. 9A illustrates rate matching around REs containing D-PDCCH. FIG. 9B illustrates rate matching around OFDM symbols.

Prior art LTE Rel. 8/9/10 systems use synchronous Hybrid Automatic Repeat Request (HARQ) for UL Synchronization Channel (SCH) transmissions. For an UL-SCH transmission on the PUSCH in subframe n a HARQ-ACK is transmitted on either the PHICH or implicitly in an UL grant in subframe n+k, where k=4 for FDD. The Rel. 10 PHICH region multiplexed across the system bandwidth has either the first 1 or 3 OFDM symbols. For this invention the UE is configured to receive DL assignments or UL grants in the D-PDCCH region. There are a few possibilities for receiving DL HARQ-ACK (ACK or NACK) signaling in response to a PUSCH transmission as described below.

In a first scheme if there is a legacy control region of at least 1 OFDM symbol, then the PHICH for all UEs can be transmitted as in the prior art Rel. 8/9/10. In this case, the PHICH resource allocation is based on: a) the PHICH duration Normal or Extended PHICH; b) the parameter, Ng, both the above parameters are signaled via the PBCH; c) the lowest indexed PRB in the first slot of the corresponding PUSCH transmission; and d) the cyclic shift field of the uplink DM-RS associated with the corresponding UL DCI format.

In a second scheme regardless of the existence of a legacy control region it may be preferable to have a unified design of UE-specific DMRS-based DL control signaling for both PDCCH and PHICH. For a non-backward compatible DL component carrier there may not be a legacy control region. There are two possibilities for this alternative. In the first possibility the DL HARQ-ACK is implicitly transmitted in the UL grant via adaptive retransmission as in earlier releases. With this approach HARQ-ACK signaling is dependent on the eNB scheduling an UL grant in subframe n+k if a PUSCH was transmitted in subframe n. The second possibility is dependent on the probability of an UL grant the HARQ-ACK signaling efficiency can be increased by also encoding the HARQ-ACK indicator (HI) in a DL assignment. The HI can be jointly encoded with the DL DCI format or it can be separately encoded and then concatenated with the encoded DCI format before modulation. These possibilities are illustrated in FIGS. 9A and 9B. The UE behavior is as follows. In subframe n+k the UE searches in its search space for either UL grants or DL assignments. If an UL grant is detected the UE uses the information contained in the UL grant for (re)transmission. If a DL assignment is detected and no UL grant is detected in a subframe n+k, the UE retransmits the negatively acknowledged transport block(s), if any. If neither an UL grant nor a DL assignment is detected the UE does not retransmit. Thus the UE assumes an implicit ACK was received. However, the UE does not flush the HARQ buffer.

Between separate and joint encoding of DL DCI and HI, separate encoding is preferred because it allows the possibility of extracting HI separately from DCI before performing channel encoding. For alternative the configuration of a DMRS-based PHICH region is UE-specific and can be different from the configuration of the D-PDCCH. For example a UE can be configured to monitor for DL/UL assignments in the D-PDCCH region and to monitor for DL HARQ in the Rel. 8/9/10 PHICH region, or alternatively can be configured to monitor for DL/UL assignments and DL HARQ in a dedicated D-PDCCH region.

If HI and DL DCI are encoded separately, there are two additional alternatives. In the first alternative the DCI is rate-matched around HI. HI is placed at a pre-designated location within the allocated resource. The D-PDCCH signal containing DCI is mapped around the resource elements containing the HI. In a first sub-alternative the HI may be mapped to the resource grid on the starting resource elements (whose number is dependent on the payload size for HI and the modulation mapping used for HI) of the set of VRBs for which D-PDCCH is configured. In a second sub-alternative the HI is mapped to a set of resource elements (RE) whose location is semi-statically signaled to the UE.

This first alternative ensures that the encoded HI is not combined with DL DCI prior to modulation mapping to Quadrature Phase Shift Keying (QPSK) symbols and mapping to CCEs. This avoids any potentially undesirable dependence of the HI being extracted on whether or not the blind decoding for PDCCH is complete. This first alternative allows the UE to detect the location of its HI prior to starting blind decodes. The payload of HI is fixed and so is the channel coding rate thus reusing the prior art Rel. 8 principle. For HI, power control is used to ensure good coverage. The UE is aware of the payload size of HI because it knows how many codewords were transmitted over uplink in the most recent transmission.

There are the following further sub-alternatives regarding signal generation for HI. In the first further sub-alternative during the frequency first mapping which occurs during non-cross interleaving, the precoded HI is mapped on to a set of resource elements (the starting resource elements or a set of resource elements location that are signaled to the UE via higher layer signaling) on the set of VRBs for which D-PDCCH is configured. The UE need only search this set of designated resource elements within each candidate D-PDCCH VRB for determining the HI if present. In the second further sub-alternative the D-PDCCH is mapped around the HI signal just as in the prior art Rel. 8. This avoids the undesirable dependence of HI the being extracted on whether or not the blind decoding is complete. Once the UE finishes determining the start and end location of the HI, it can start blind decoding for extracting its control payload.

In the second alternative for coding the HI and DL DCI separately, the DCI is not rate-matched around HI. The UE assumes that the DCI information signal are never mapped around resource elements mapped to HI. In this case, HI is placed at any pre-designated location in the resource element grid which cannot overlap with the transmission of the D-PDCCH containing DCI data. In a first sub-alternative the HI locations are semi-statically signaled to the UE such that DCI mapping will never occur across resource element boundaries containing HI. In a second sub-alternative the HI locations are fixed and based on the largest possible DCI payload corresponding to the downlink system bandwidth. This ensures that DCI mapping will never occur across resource elements containing HI.

Figure 11:
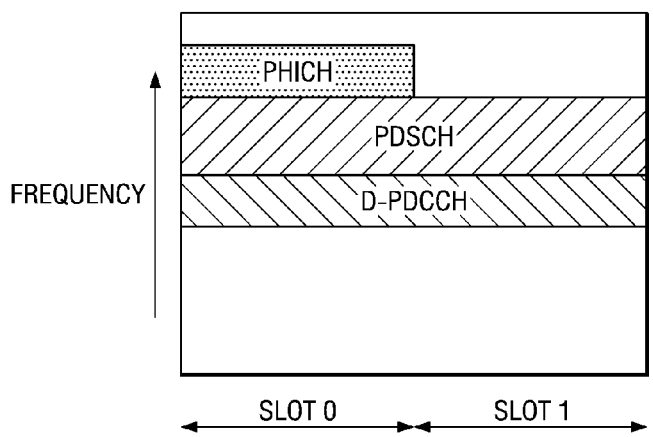
FIG. 11 illustrates the case of a non-backward compatible CC without a legacy control region.

A third scheme allocates a new semi-statically signaled PHICH region which consists of one or more PRBs in the first slot of the subframe. This region is common to all UEs and the UE can use a similar prior art Rel. 8/9/10 linkage between PHICH resource and lowest indexed PRB/cyclic shift index. This may result in some restriction in eNB scheduling in the PDSCH region. This prevents using UE-specific DMRS for demodulation. Thus this is suitable for the case of a non-backward compatible CC without a legacy control region as shown in FIG. 11. In a different embodiment the PHICH region is FDM multiplexed in a subframe where the PHICH region occupies both slots of a subframe.

The following is a description of HI transmission via DM-RS precoding. For a UE configured to receive its PDCCH with DMRS-based precoding D-PDCCH, the HI is transmitted on antenna port 7 or 8. The UE-specific antenna port 7 or 8 and SCID of 0 or 1 of a HI is semi-statically configured by higher-layer RRC-signaling. For example, a UE may be configured to decode its HI on antenna port 8. It is possible to support rank greater than 1 transmission of HI in case ACK-NAK for multiple uplink codewords if desired. The transmission rank and set of DMRS antenna ports are UE-specific and semi-statically configured by the higher layer. In a first example the UE is configured to receive HI with rank of 1 transmission on a single antenna port 7 or 8 configured by higher-layer. In a second example the UE is configured by higher layer to receive HI with rank greater than 1 spatial multiplexing on antenna ports (7, . . . , 7+R−1).

The following is a description of ePDCCH rate-matching around CRS positions of a set of neighboring cells. In this invention ePDCCH transmission can be configured via higher-layer signaling to be muted (rate-matched around) on the CRS positions of a set of neighboring cell (s). Such ePDCCH muting is beneficial in range-extended het-nets where the CRS transmissions of an aggressor cell(s) required for legacy support can deteriorate reception at a victim UE that is receiving its ePDCCH from a weaker cell even during almost blank subframes of the aggressor cell(s). By muting ePDCCH on the CRS positions of the stronger cell, the weaker cell can ensure that the rate-matched ePDCCH is reliably received at the victim UEs. In this invention the zero-power ePDCCH may be configured via higher-layer signaling. Alternately the v-shifts or the cell IDs of the cells on whose CRS positions the ePDCCH is rate-matched are signaled via higher-layer. In a further alternative upon configuration with zero-power ePDCCH on CRS positions of a set of neighboring cell(s), the UE shall assumes that its ePDCCH is rate-matched around the CRS locations of a set of neighboring cell(s).

Figure 12:
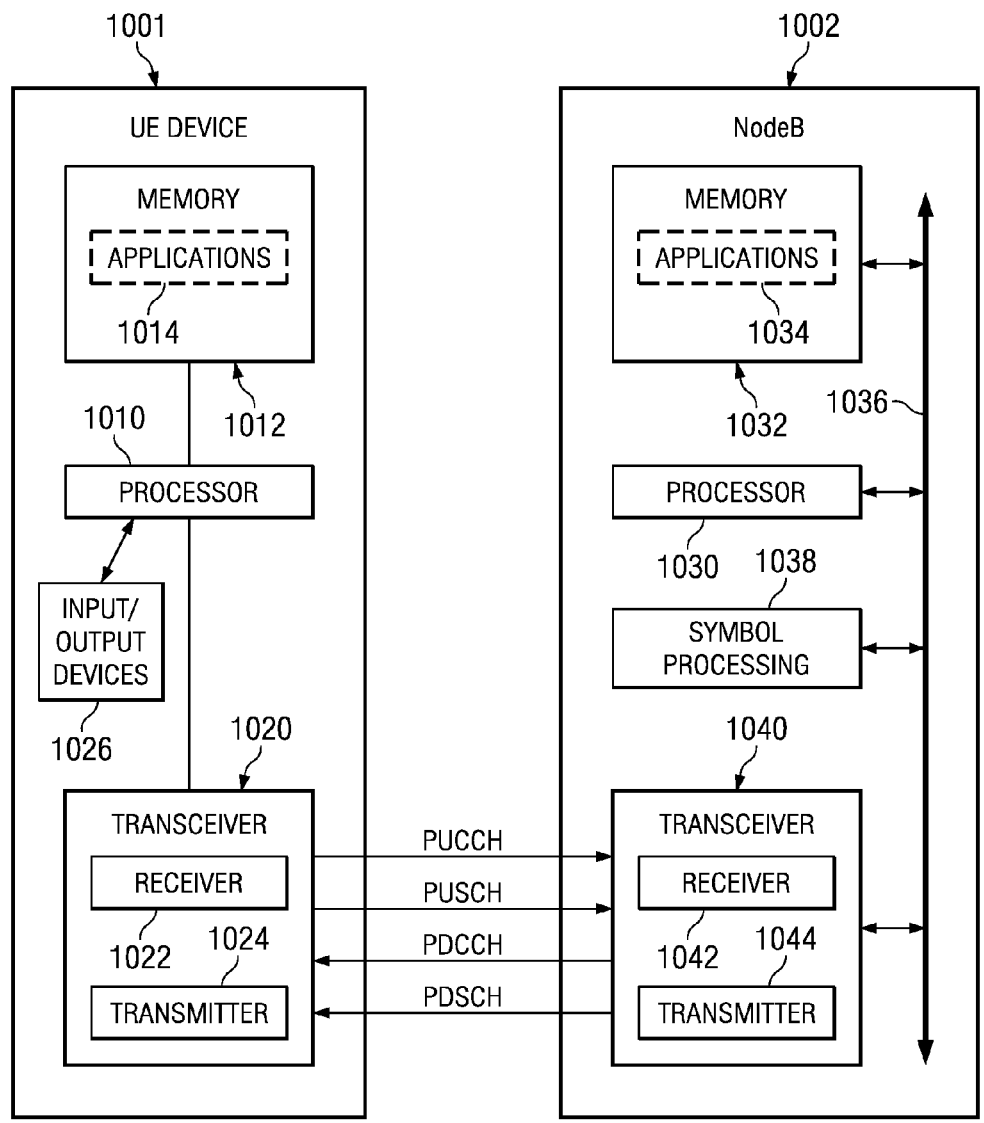
FIG. 12 is a block diagram illustrating internal details of a base station and a mobile user equipment in the network system of FIG. 1 suitable for implementing this invention.

FIG. 12 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (basestation) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of operating a user equipment (UE), comprising:
    receiving a downlink (DL) assignment on a Demodulation Reference Signal (DMRS)-based physical downlink control channel (D-PDCCH) and if the user equipment (UE) detects via physical control format indicator channel (PCFICH) on its legacy control region that the number of OFDM symbols is strictly smaller than the starting symbol for D-PDCCH, then the user equipment (UE) shall assume one of the two following embodiments for determining the resources on which its PDSCH is mapped:
        when the DL-assignment on D-PDCCH overlaps with the DL assignment for PDSCH, the user equipment (UE) assumes that in the overlapping PRBs, the PDSCH is also present on the OFDM symbols between the last symbol of the legacy PDCCH region and the first symbol of the D-PDCCH; and
        when the DL-assignment on D-PDCCH overlaps with the DL assignment for PDSCH, the user equipment (UE) assumes that its PDSCH is also present on the OFDM symbols between the last symbol of the legacy PDCCH region and the first symbol of the D-PDCCH.

2. A method of operating a user equipment (UE), comprising:
    receiving a precoded downlink (DL) control information transmitted on at least one demodulation reference signal antenna port;
    the precoded, modulation downlink control information is received on a set of N1 physical resource block pairs in a subframe from an orthogonal frequency division multiplexing symbol T1 to an orthogonal frequency division multiplexing symbol T2, and the user equipment is semi-statically configured by higher layer signaling with the orthogonal frequency division multiplexing symbol T1.

3. The method of claim 2, wherein the downlink control information is a downlink assignment or an uplink grant.

4. The method of claim 2, wherein the user equipment receives the precoded, modulated downlink control information on one demodulation reference signal antenna port.

5. The method of claim 2, wherein the user equipment receives the precoded, modulated downlink control information on more than one demodulation reference signal antenna port.

6. The method of claim 2, wherein the at least one demodulation reference signal antenna port is configured by higher layer signaling.

7. The method of claim 2, wherein the user equipment (UE) is configured by higher layer signaling with a scrambling sequence to demodulate downlink control information transmitted on the at least one demodulation reference signal antenna port.

8. A method of operating a user equipment (UE), comprising:
   receiving precoded modulated downlink control information transmitted on at least one demodulation reference signal antenna port, wherein the precoded modulated downlink control information is mapped to a set of N1 physical resource block pairs in a subframe from an orthogonal frequency division multiplexing symbol T1 to an orthogonal frequency division multiplexing symbol T2; and
   semi-statically configuring the user equipment using higher layer signaling with the orthogonal frequency division multiplexing symbol T1.

9. The method of operating a user equipment (UE) of claim 8, wherein the UE is further enabled to demodulate the precoded, modulated downlink control information on more than one demodulation reference signal antenna ports.

10. The method of operating a user equipment (UE) of claim 8, wherein the UE is semi-statically configured by higher layer signaling with a scrambling sequence to demodulate said downlink control information transmitted on the at least one demodulation reference signal antenna port.

11. The method of operating a user equipment (UE) of claim 8, wherein the UE is configured by higher layer signaling with the set of N1 physical resource block pairs.

* * * * *